United States Patent [19]

Sapir

[11] 3,735,148

[45] May 22, 1973

[54] SYSTEM FOR HEATING OR AIR CONDITIONING

[75] Inventor: Said Sapir, Westlake Village, Calif.

[73] Assignee: International Telephone and Telegraph Corporation, New York, N.Y.

[22] Filed: Jan. 10, 1972

[21] Appl. No.: 216,715

Related U.S. Application Data

[62] Division of Ser. No. 31,167, April 23, 1970.

[52] U.S. Cl. .................................. 307/133, 307/141
[51] Int. Cl. ............................................... H01h 33/44
[58] Field of Search ........................... 307/141, 133; 219/115; 317/11 A

[56] References Cited

UNITED STATES PATENTS 3,335,360  8/1967  Reinert ............................. 307/133
3,381,226  4/1968  Jones et al. ....................... 307/133

Primary Examiner—Robert K. Schaefer
Assistant Examiner—William J. Smith
Attorney—C. Cornell Remsen, Jr., Walter J. Baum, Paul W. Hemminger et al.

[57] ABSTRACT

A system for heating or air conditioning wherein provision is made for controlling fan speed and/or the heating and modulating valve in accordance with thermostat demand. The thermostat puts out a step function followed by a ramp for both on-off and proportional control. One valve may be used in series with another for each function. A logic gate is provided to override the speed control when the plenum is cold. Half speed is provided for a hot plenum even though there is no thermostat demand for heat. Two detectors are provided for plenum temperature. The same thermostat is used with both voltage sensitive and current sensitive circuits.

1 Claim, 6 Drawing Figures

Patented May 22, 1973
3,735,148
5 Sheets-Sheet 1
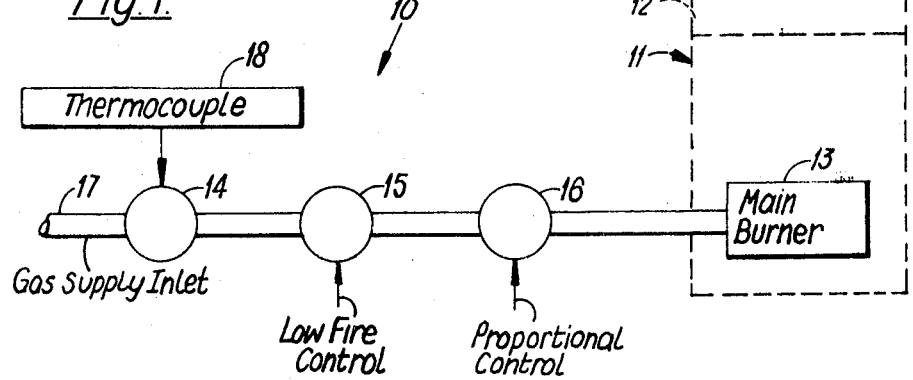
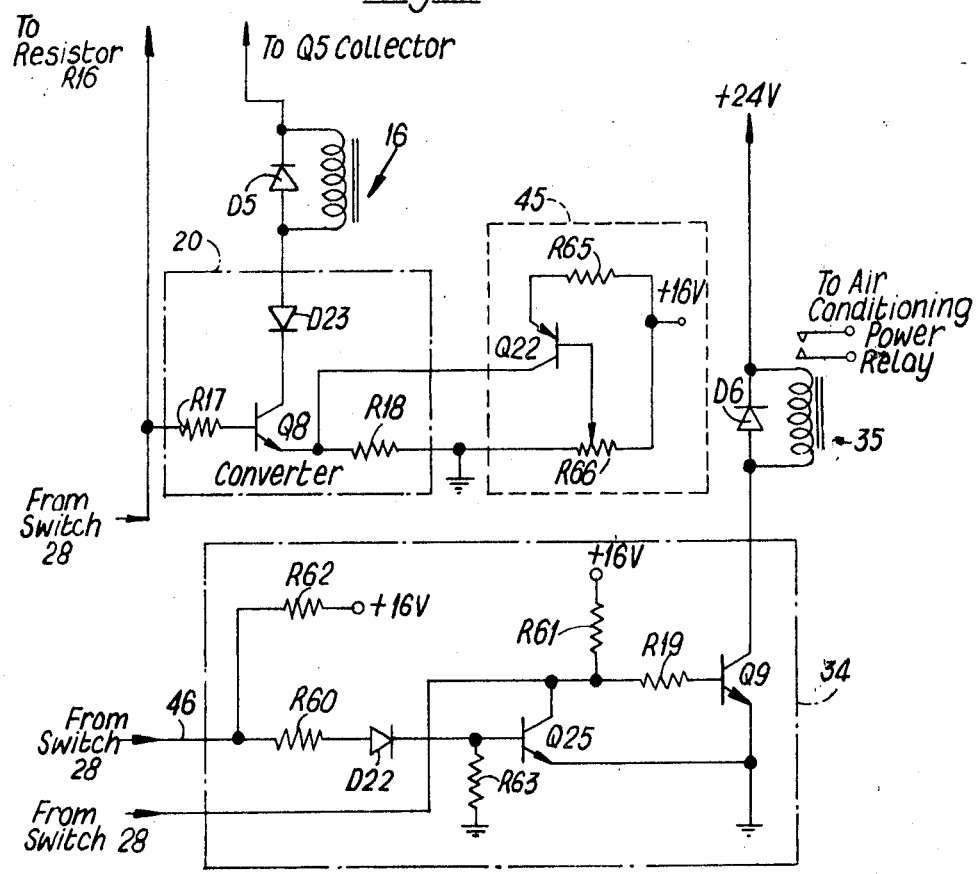

SYSTEM FOR HEATING OR AIR CONDITIONING

This is a division of copending application Ser. No. 31,167, filed Apr. 23, 1970. The benefit of the filing date of said copending application is, therefore, hereby claimed for this application.

BACKGROUND OF THE INVENTION

This invention relates to temperature control systems and, more particularly, to heating or air conditioning units for offices, homes and the like.

In the past, use has been made of a bimetal-operated mechanical switch in a thermostat to control a gas furnace and associated blower. Normally, the blower and the gas are turned on when the ambient is too low and turned off when it is sufficiently high.

The above-described on-off action has several substantial disadvantages. In the first place, the one and off cycling causes undue wear on the equipment. The equipment further does not operate efficiently or economically in this manner. The blast of air is uncomfortable to people in the space where the blower is circulating the air. The on-off cycling also creates an ambient temperature which rises and falls with the cycle. The uneven character of the ambient temperature is, thus, also uncomfortable to those occupying the heated or cooled space.

Noise is also a problem. For example, with a large valve opening and a high velocity blower, the ducts will crack continually during heating by the main burner, and then will continue to crack when the plenum is cooled by the blower. Normally, the blower will not operate until the plenum temperature is high enough. The plenum heating and cooling, thus, creates an additional cycle which adds to the cycling problem.

Noise is also a result of cycling. When the main burner lights up, it makes noise. Then the fan starts up and when it stops, it, too, makes noise.

SUMMARY OF THE INVENTION

In accordance with the present invention, the above-described and other disadvantages of the prior art are overcome by controlling fan speed in accordance with thermostat demand.

A further feature of the invention is to provide a low minimum fire plus a gradually increasing gas flow for increased thermostat demand.

Thus, it is seen that by varying fan speed and fire intensity gradually, equipment performance, efficiency, and economy are improved. On-off cycling is reduced because of the gradual increase in fan speed and fire intensity. Air velocity is reduced and comfort is thereby increased. A more uniform and comfortable ambient temperature is also produced because the control system of the invention follows closely the departure of ambient from desired. Noise is reduced because cycling is minimized.

It is another feature of the invention that certain gating logic is provided, for example, to run the fan at half speed when the plenum is hot but the thermostat is no longer calling for heat. The half speed is, thus, more comfortable.

It is also a feature of the invention that two plenum temperature detectors are employed--one, to prevent an excessive burner run and the other, for fan control. Thus, one function is not tied to the other.

Still another feature of the invention is the use of the same thermostat with a mode switch with both a heating and cooling system.

Still another feature of the invention resides in a solid state thermostat for producing a step function followed by a ramp for producing both a sharp on-off signal and also a signal from which fan speed and fire intensity may be proportioned to temperature differential, i.e., set point minus ambient.

A further feature of the invention resides in the use of both current and voltage sensitive circuits responsive to the self-same thermostat output.

Still a further feature of the invention resides in the use of two valves in series, one of which can perform as an on-off, snap-acting valve and the other of which can modulate gas flow according to thermostat demand. In this manner, more accurate proportioning can be achieved with a more positive gas shut off.

The above-described and other advantages of the invention will be better understood from the following description when considered in connection with the accompanying drawings.

BRIEF DESCRIPTION OF THE DRAWINGS

In the drawings, which are to be regarded as merely illustrative:

FIG. 1 is a diagrammatic view of a heating system;
FIGS. 3, 4, 5, and 6 are schematic diagrams of the blocks shown in FIG. 2.

DESCRIPTION OF THE PREFERRED EMBODIMENT

Figure 2:
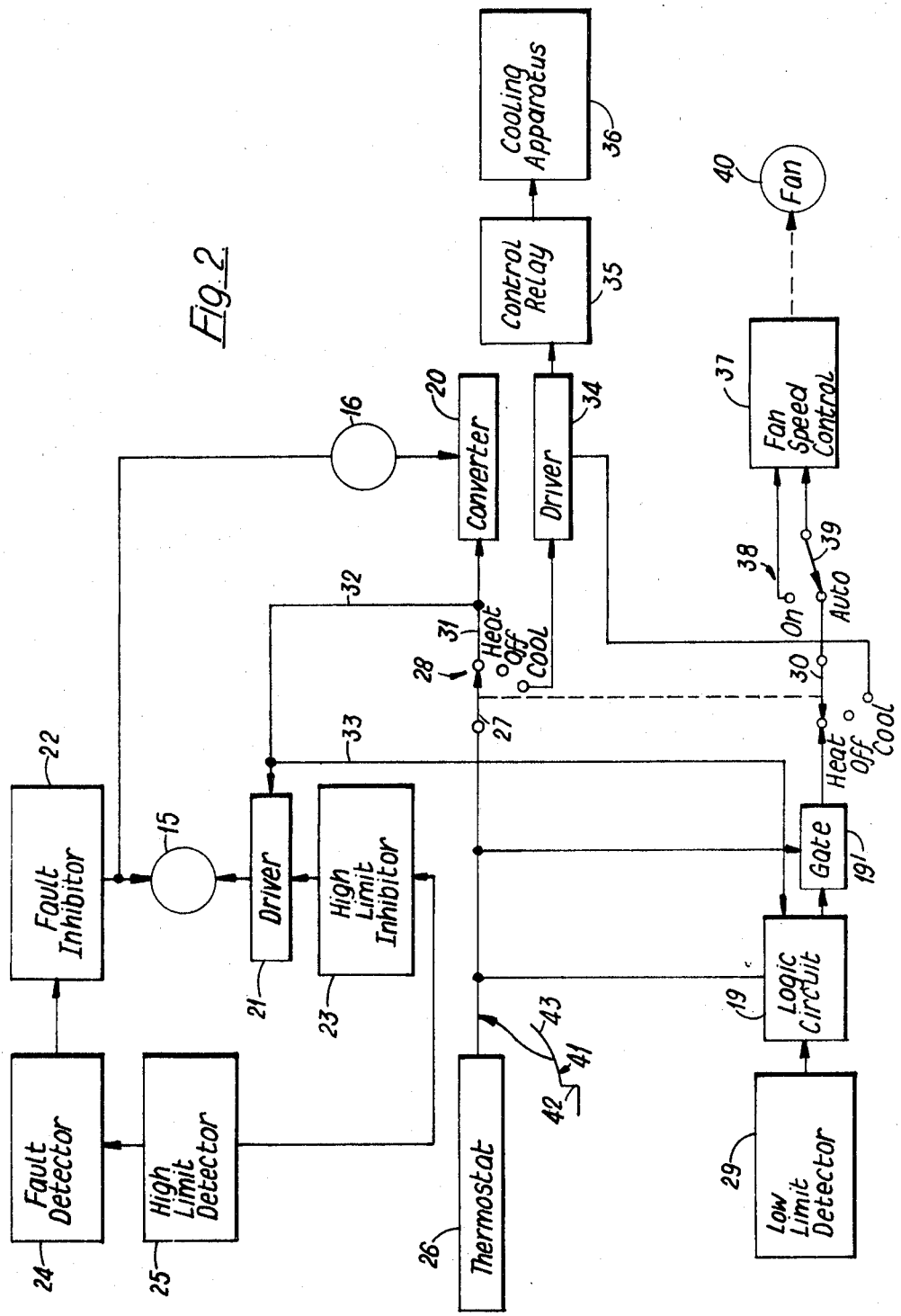
FIG. 2 is a block diagram of a control system.

A heating system 10 is shown in FIG. 1, including a furnace 11 having a heat exchange or plenum 12 which is heated by a main burner 13. Three valves 14, 15, and 16 are connected in series in a gas pipeline 17 from a gas supply inlet to main burner 13. A thermocouple 18 is located adjacent a pilot burner, not shown, inside furnace 11 adjacent main burner 13. As is conventional, failure of the pilot light will cause valve 14 to close through the failure of thermocouple 18 to supply an energizing voltage.

Valve 15 is a snap-acting, on-off valve which receives an energizing signal from a thermostat 26 shown in FIG. 2. Valve 16 receives a proportional control signal from a converter 20 shown in FIG. 2. Valve 15 remains either completely closed or completely open. Valve 16 supplies an amount of gas to burner 13 in proportion to the magnitude of the electric current thereto. All valves 14, 15, and 16 are conventional. For example, see U.S. Pat. No. 3,469,590. Valve 16 may be a conventional voice coil operated diaphragm valve.

As shown in FIG. 2, valve 15 is turned on and off by thermostat 26 operating through a driver 21. Energization of valve 15 may be prevented either by a fault inhibitor 22 or a high limit inhibitor 23. Inhibitor 22 is actuated by a fault detector 24. Inhibitor 23 is actuated by a high limit detector 25.

Thermostat 26 supplies an output signal to a logic circuit 19, to one pole 27 of a selector switch 28, and to a gate 19'. Logic circuit 19 also receives an input from a low limit detector 29.

Selector switch 28 has a second pole 30 which is ganged with pole 27. Each pole has a heat, cold and off contact. Logic circuit 19 receives another input from thermostat 26 through the heat contact of pole 27 over a lead 31, a lead 32, and a lead 33.

Converter 20 receives the output of thermostat 26 from the heat contact of pole 27. A driver 34 is connected from the cool contact of pole 27 to a control relay 35. Cooling apparatus 36 is connected from relay 35. Driver 34 also supplies a control voltage to a fan speed control 37 through the cool contact of pole 30. A fan switch 38 has a pole 39 with an on contact and an automatic contact. The on contact is connected to control 37. The automatic contact is connected to pole 30. Pole 39 is connected to control 37. Control 37 controls the speed of a fan 40. Fan 40 is operated during both heating and cooling, although not necessarily continuously. Cooling apparatus 36 may simply be a compressor or the like. Fan 40 may, thus, circulate cool air as well as warm air. The same fan 40 may operate by circulating air in a heat exchanging relation with plenum 12. When poles 27 and 30 are connected to the off contacts, nothing happens. When poles 27 and 30 are connected to the heat contacts, the system will provide heating. When the poles 27 and 30 are connected to the cool contacts, the system will provide cooling. When pole 39 is connected to the on contact, fan 40 will run at a constant speed all of the time independent of any other condition in the system. When pole 39 is connected to the automatic contact, control 37 may cause fan 40 to run at various speeds during heating. However, in accordance with the embodiment of the present invention which is disclosed, the speed of fan 40 is constant during cooling. Further, the amount of cooling provided by apparatus 36 remains constant during the time that it is switched on.

High limit detector 25 detects whether or not plenum 12 has a temperature above the predetermined level. Low limit detector 29 detects whether or not the temperature of plenum 12 is below the predetermined temperature. The reference temperature of detectors 25 and 29 are different, the reference temperature of detector 25 being higher than that of detector 29.

Both detectors 25 and 28 employ thermistors. Detector 24 detects the breakage of the thermistor of detector 25.

Thermostat 26 produces an output voltage which varies with temperature as indicated at 41 including a step at 42 at a critical temperature and a ramp at 43. The temperature at which step 42 is produced is manually set in the thermostat 26. The ramp 43 is linear with, and therefore directly proportional to, the difference between the set temperature and the ambient temperature.

Inhibitors 22 and 23 are, in effect, electronic switches in series with a power supply and valve 15. Thus, if either of the switches 22 or 23 open, driver 21 cannot energize valve 15.

Converter 20 is a voltage-to-current converter. Converter 20, thus, converts with output voltage of thermostat 26 to a current proportional to the voltage represented by curve 41. The amount that valve 16 opens, is then directly proportional to the temperature difference.

Logic circuit 19 operates gate 19'. Gate 19' supplies a voltage to control 37 which causes fan 40 to be driven at different speeds, depending upon different conditions. These conditions are as follows. When the output of detector 29 indicates that plenum 12 is cold, the speed of fan 40 is reduced to zero. If the plenum is warm and thermostat 26 is calling for heat, the speed of fan 40 is directly proportional to the output of thermostat 26. If plenum 12 is warm and thermostat 26 is not calling for heat, fan 40 is run at half speed, i.e., at a constant speed.

OPERATION

If the thermistor of detector 25 should break, fault detector 24 will cause inhibitor 22 to shut off valve 15 and thereby shut off all gas to main burner 13 as shown in FIG. 1. If plenum 12 is too hot, detector 25 will cause valve 15 to be shut off again by inhibitor 23. Otherwise, when the poles 27 and 30 are connected to the heat contacts, the system will operate as follows. When the ambient temperature falls below the set temperature of thermostat 26, thermostat 26 will produce an output starting with step function 42. This will cause valve 15 to open. Converter 20 may also cause valve 16 to open a slight amount. The plenum will then generally be cool and detector 29 will prevent fan 40 from being turned on. If the ambient temperature begins to fall, the output of thermostat 26 will continue to increase as indicated at 43. Valve 16 will then be opened still further. When plenum 12 gets warm, logic circuit 19 will through gate 19' cause control 27 to rotate fan 40 at a speed proportional to ramp 43. When thermostat 26 drops below the set point, valve 16 will be gradually closed and valve 15 will be abruptly closed at step function 42. If the plenum 12 is still hot, logic circuit 19 through gate 19' will cause fan 40 to be run at a constant half speed until the plenum 12 cools.

In general, for very low heat demands, valve 15 may cycle briefly, and valve 16 may not be turned on substantially. On the other hand, with rather a substantial demand, the system will operate continuously on the ramp 43. When poles 27 and 30 are connected to the cool contacts, apparatus 36 and fan 40 will be cycled on and off in the conventional manner.

Driver 34 is an inverter. Provision is made to use the output of the self-same thermostat 26 for both heating and cooling.

It is also a feature of the invention that thermostat 26 puts out an output signal which changes in proportion according to curve 41. This self-same output is used directly in logic circuit 19 and control 37, whereas it is converted by converter 20 for control of valve 16.

Figure 3:
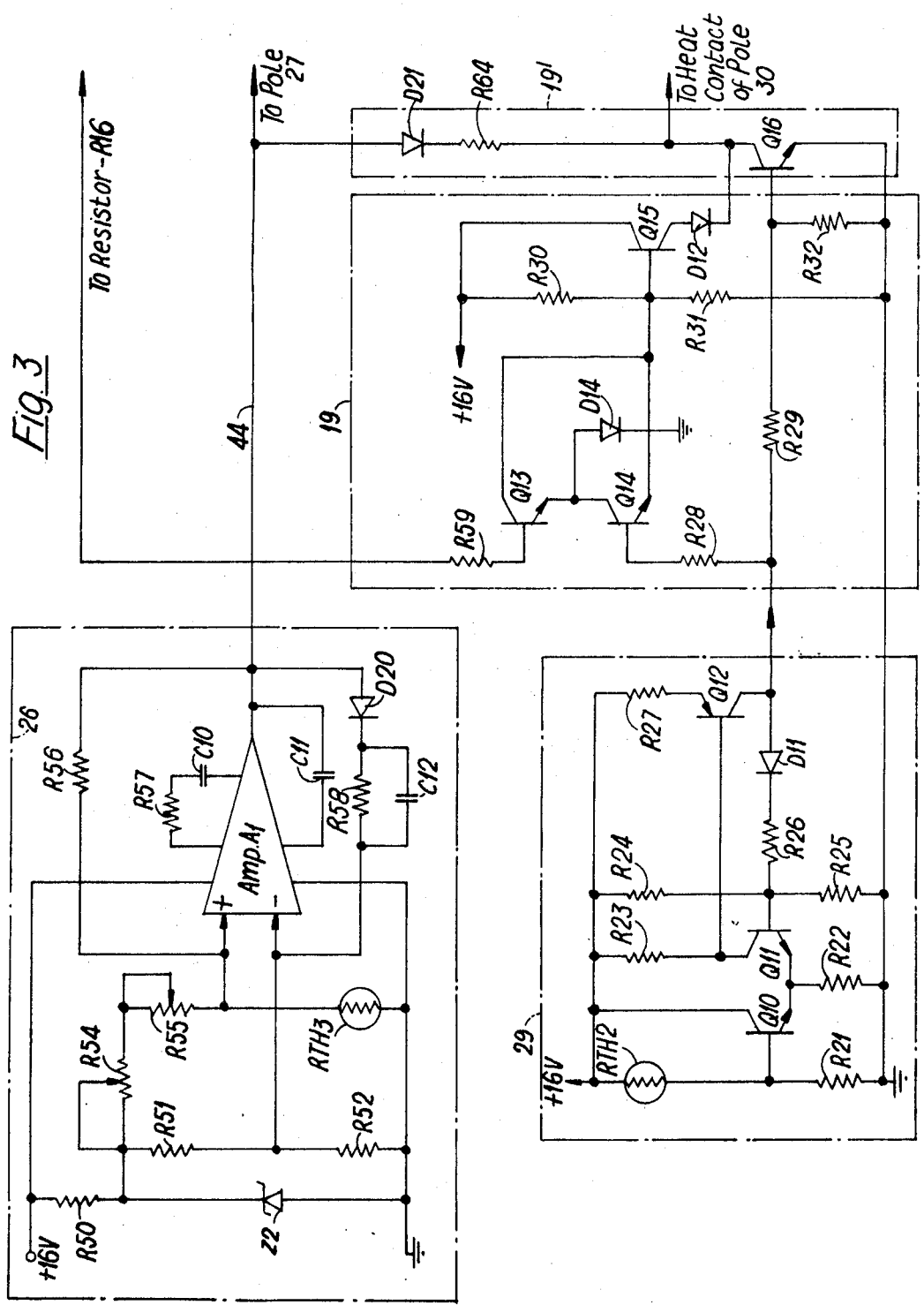

Thermostat 26, detector 29, circuit 19, and gate 19' are shown in FIG. 3. Thermostat 26 includes a bridge R51, R52, R55, and RTH3. R51, R52, and R55 are resistors. RTH3 is a thermistor located in plenum 12. The thermostat may have resistor R55 calibrated in degrees for the setting thereof. Resistor R54 may be employed to calibrate the bridge. The voltage to the bridge is supplied by a resistor R50 and a zener diode Z2. The output of the bridge is connected to an amplifier A1 having a feedback resistor R56 and a series feedback circuit including a diode D20 and a resistor R58. A capacitor C12 is connected in parallel with resistor R58. The point of forward and back bias of diode D20 produces the step function 42. Amplifier A1 also has external connections including capacitors C10, C11, and resistor R57. The output of thermostat 26 is provided on a lead 44. Lead 44 is connected to pole 27 and to a diode D21 in gate 19.

Dectector 29 includes a thermistor RTH2, resistors R21, R22, R23, R24, R25, R26, and R27. Transistors Q10 and Q11 operate substantially as bilevel devices with one emitter resistor R22. Transistor Q12 provides an output to gate 19 and feedback through diode D11 and resistor R26.

Circuit 19 includes transistors Q13 and Q14. Transistor Q16 in gate 19' operates as a switch so as to connect the heat contact of pole 30 (the input to fan speed control 37) to ground when the plenum is cold. Transistor Q16 receives a control signal from detector 29 via resistors R29 and R32. Circuit 19 also includes resistor R28, R30, and R31 and diodes D12 and D14. Transistors Q13 and Q14 cause an output to fan speed control 37 through the heat contact of pole 30 to hold the speed of fan 40 at a half speed when the thermostat 26 is no longer calling for heat but when the detector 29 indicates that plenum 12 is still hot.

Transistors Q13 and Q14 act as a logical "or" gate, and ground the base of transistor Q15 either when the thermostat is calling for heat, or when the plenum is cold. When the plenum is hot and the thermostat is not calling for heat, the base of transistor Q15 is biased at six volts which runs the fan at half speed. Resistors R30 and R32 act as a voltage divider to develop this bias, a 16 volt supply being connected to one end of resistor R30.

Diode D21 of gate 19' and diode D12 of circuit 19 prevent interference of one speed control circuit with the other. When diode D21 is back biased, transistor Q15 supplies the half speed voltage. When diode D12 is back biased, the thermostat signal provides a variable speed control. When transistor Q16 is turned on, resistor R64 prevents the output of thermostat 26 to pole 27 from being grounded.

Figure 4:
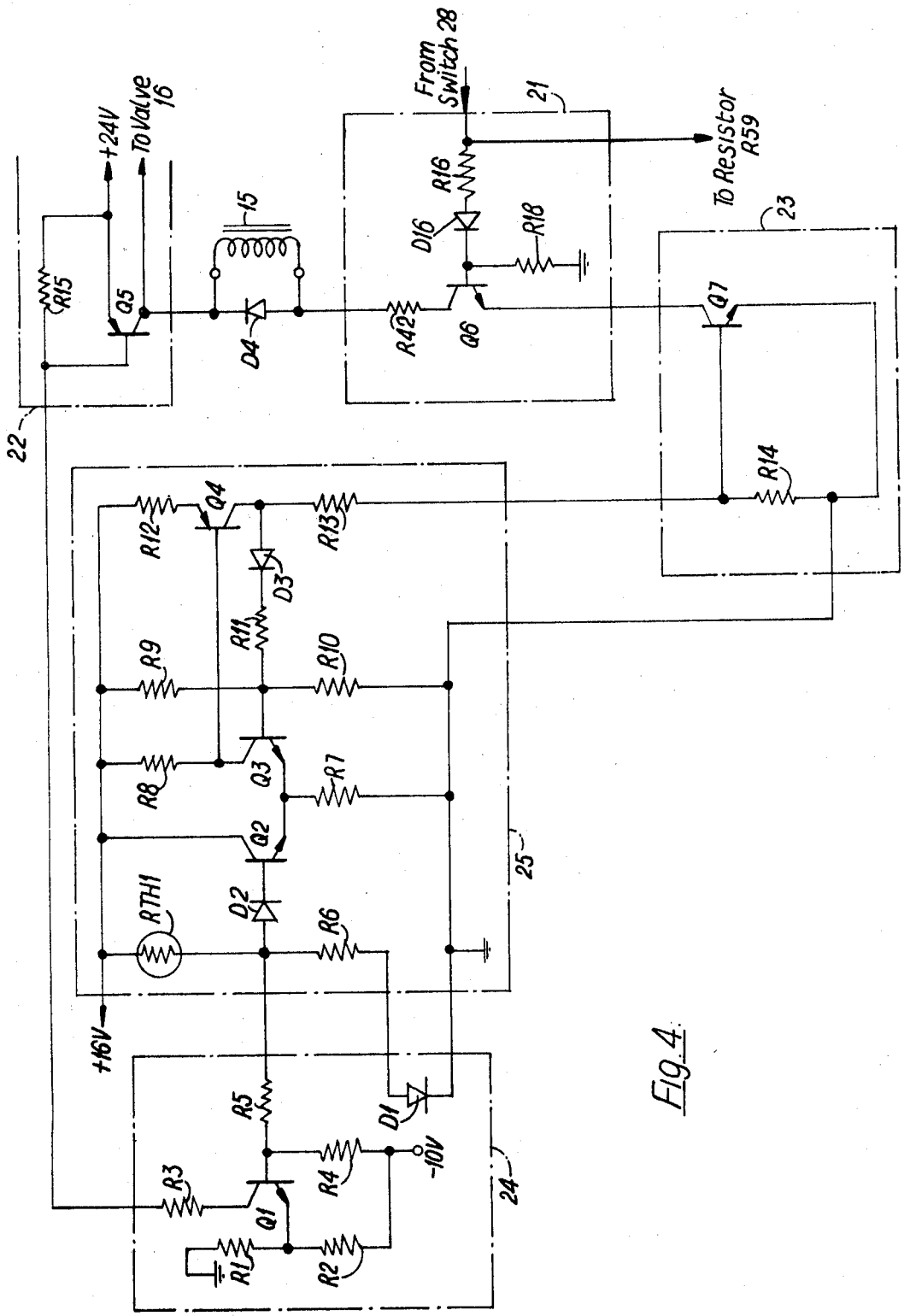

Detectors 24 and 25, inhibitors 23 and 22, driver 21, and valve 15 are shown in FIG. 4. Detector 24 includes resistors R1, R2, R3, R4 and R5, a transistor Q1, and a diode D1. Inhibitor 22 includes a resistor R15 and a transistor Q5. Detector 24 merely turns transistor Q5 off when valve 15 should be de-energized.

Detector 25 is substantially identical to detector 29 including a thermistor RTH1, resistors R6, R7, R8, R9, R10, R11, and R12, diodes D2 and D3, and transistors Q2, Q3, and Q4. The output of detector 25 is impressed upon a transistor Q7 in inhibitor 23 through resistor R13 and a resistor R14 in inhibitor 23. Detector 25 merely turns transistor off when valve 15 should be de-energized. Driver 21 includes an input circuit of resistors R16 and R48 with a diode D10. Driver 21 has an output circuit including a resistor 42 for the collector of a transistor Q6. A diode D4 is connected in parallel with valve 15.

Converter 20 and driver 34 are shown in FIG. 5. Converter 20 includes an input resistor R17, an emitter resistor R18, a diode D23, and a transistor Q8. A diode D5 is connected in parallel with valve 16. A circuit 45 may be provided, if desired, to adjust low fire. This circuit includes resistors R65 and R66 and a transistor Q22. Converter 20 produces an output current which may be similar to waveform 41 shown in FIG. 2. However, the pedestal and the ramp may both be varied independently of the curve 41. The height of the pedestal may be varied by varying the resistance of resistor R18. The slope of the ramp may be varied by changing the position of the wiper on potentiometer R66.

Driver 34 includes resistors R60, R61, R62, R63, and R19. Driver 34 also includes a diode D22 and transistors Q25 and Q9. A diode D6 is connected in parallel with the winding of relay 35. Driver 34 acts as an inverter for the output of thermostat 26 received on a lead 46.

Figure 6:
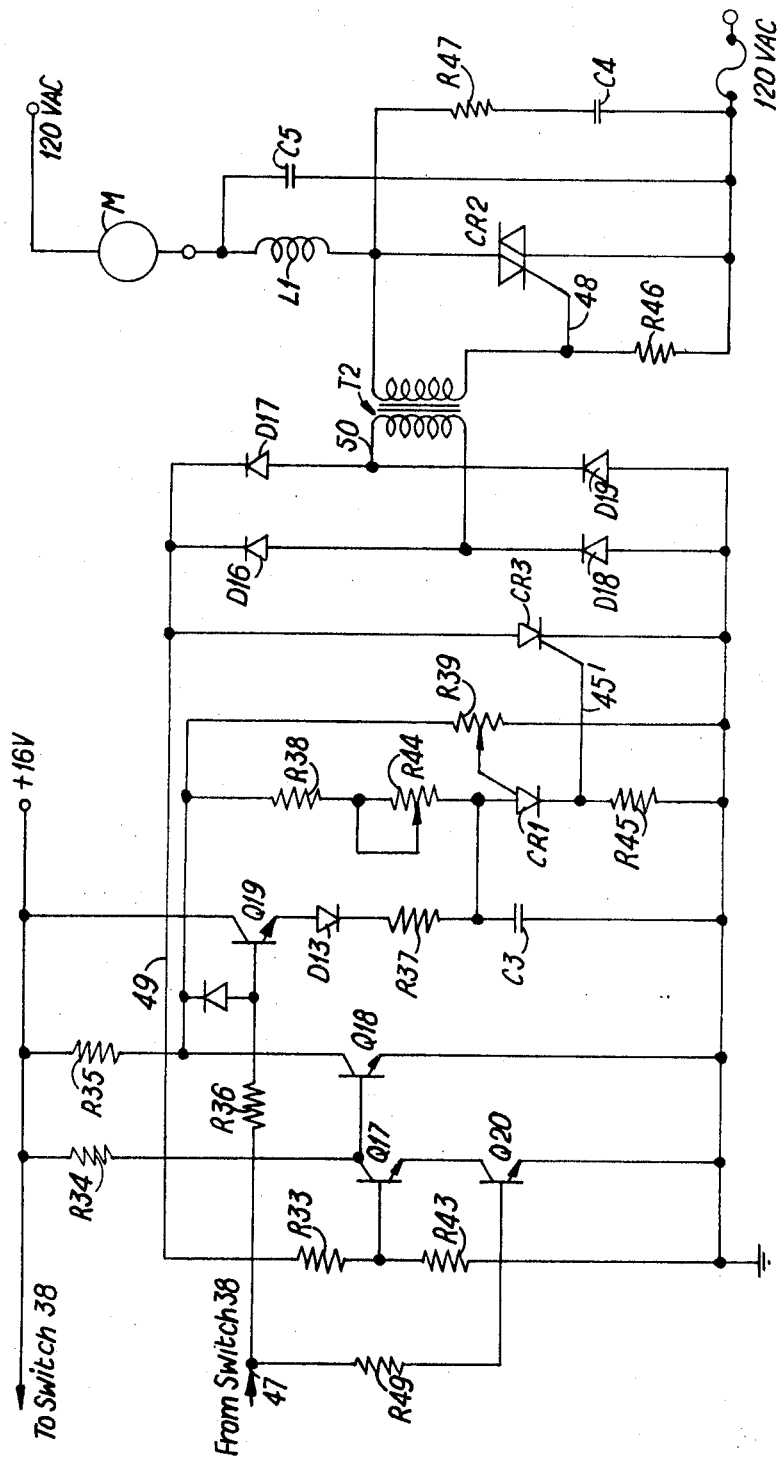

Fan speed control 37 is shown in FIG. 6. If switch pole 39 is moved to the on contact, the control 37 receives a constant 16 volt input on input lead 47. Otherwise, gate 19' supplies an input on lead 47 to cause fan 40 to rotate at a speed proportional to the output of thermostat 26 or to rotate at a constant half speed as explained previously. Control 37 includes resistors R49, R33, R34, R35, R37, R38, R44, R45, and R47. Control 37 also includes transistors Q17, Q20, and Q18. Control 37 also includes diodes D15, D13, D16, D17, D18, and D19. Control 37 also includes capacitors C3, C4, and C5. Control 37 also includes a unijunction transistor CR1 and a silicon-controlled rectifier CR3, a transformer T2, and inductor L1, and a triac CR2.

Note will be taken that diodes D16, D17, D18, and D19 form a bridge rectifier. In order to obtain proper control of the current to fan motor M, it has been found that timing from zero current through triac CR2 is necessary. Triac CR2 is similar to a silicon-controlled rectifier, but it may pass current in both directions depending upon the presence of a signal on gate 48. When the current through triac CR2 goes to zero, the diode bridge is energized to produce an output timing signal which is received by transistor Q17 over a lead 49 through resistor R33. Transistor Q17 through transistor 18 and diode D13 then causes capacitor C3 to charge through transistor Q19 to a potential substantially the same as that impressed upon control 37 via lead 47. The speed control is thus a pedestal plus ramp. The pedestal is reached when capacitor C3 charges rapidly at the beginning of the timing cycle. Capacitor C3 then charges at a slower rate until unijunction transistor CR1 fires. When unijunction transistor CR1 fires, a triggering signal is impressed on the gate of silicon-controlled rectifier CR3 via wire 45'. The silicon-controlled rectifier CR3 then switches into conduction effectively shorting the secondary 50 of the transformer T2 through the bridge D16, D17, D18 and D19. This causes gate 48 to turn on the triac CR2 and allow it to pass current.

Note will be taken that the pedestal plus ramp varies the conduction angle of power input to the motor and therefore the motor speed. It is a feature of the invention that transformer T2 thus acts as a bi-directional transmission device in that the starting signal for the timer comes from the triac side of the circuit and the conduction pulse from opposite side thereof, i.e. the low voltage side.

From the foregoing, it will be appreciated that one valve may be substituted for both valves 15 and 16. Further, the invention may be applied to air conditioning by itself, to heating by itself, or to both.

I claim:

1. In a current control circuit, the combination comprising: a gate including a current control electrode; first means for generating a timing pulse when the current through said gate passes through zero; and second means responsive to said timing pulse for applying a gating signal to said control electrode at some time after said timing pulse is generated; a transformer being provided having a primary winding and a secondary winding, said gate being a triac having said electrode connected to said primary winding, a full wave bridge rectifier having one pair of corners connected across said secondary, a silicon controlled rectifier connected across the other pair of corners and poled in the same direction as the rectifiers in said bridge, said silicon controlled rectifier having a gate, said second means including means to supply a signal to said rectifier gate and thereby to short circuit said secondary.

* * * * *